United States Patent
Leung

(10) Patent No.: US 8,321,841 B2
(45) Date of Patent: Nov. 27, 2012

(54) VALIDATION FRAMEWORK FOR SERVICE ORIENTED ARCHITECTURE (SOA) APPLICATION ADOPTION

(75) Inventor: Humie Leung, Vancouver (CA)

(73) Assignee: International Business Machines Corporation, Armonk, NY (US)

(*) Notice: Subject to any disclaimer, the term of this patent is extended or adjusted under 35 U.S.C. 154(b) by 1357 days.

(21) Appl. No.: 11/971,036

(22) Filed: Jan. 8, 2008

(65) Prior Publication Data

US 2009/0177508 A1 Jul. 9, 2009

(51) Int. Cl.
*G06F 9/44* (2006.01)
*G06F 9/46* (2006.01)
*G06F 3/048* (2006.01)

(52) U.S. Cl. ........ 717/126; 717/104; 718/101; 718/103; 718/104; 715/772

(58) Field of Classification Search .................. None
See application file for complete search history.

(56) References Cited

U.S. PATENT DOCUMENTS

| | | | | |
|---|---|---|---|---|
| 5,392,220 | A * | 2/1995 | van den Hamer et al. | 716/105 |
| 5,634,113 | A * | 5/1997 | Rusterholz | 716/106 |
| 6,009,405 | A * | 12/1999 | Leymann et al. | 705/7.27 |
| 6,038,538 | A * | 3/2000 | Agrawal et al. | 705/7.11 |
| 6,105,018 | A * | 8/2000 | Demers et al. | 1/1 |
| 6,633,886 | B1 * | 10/2003 | Chong | 707/798 |
| 6,826,579 | B1 * | 11/2004 | Leymann et al. | 717/131 |
| 7,421,696 | B2 * | 9/2008 | Bowie-Britton | 718/106 |
| 7,424,696 | B2 * | 9/2008 | Vogel et al. | 716/133 |
| 7,493,602 | B2 * | 2/2009 | Jaeger et al. | 717/126 |
| 7,577,554 | B2 * | 8/2009 | Lystad et al. | 703/2 |
| 7,580,911 | B2 * | 8/2009 | Sun et al. | 706/50 |
| 7,673,261 | B2 * | 3/2010 | Adir et al. | 716/106 |
| 7,844,959 | B2 * | 11/2010 | Isard | 717/149 |
| 7,849,448 | B2 * | 12/2010 | Yunus et al. | 717/126 |
| 7,932,907 | B2 * | 4/2011 | Nachmanson et al. | 345/440 |
| 8,015,039 | B2 * | 9/2011 | Brunswig et al. | 717/126 |
| 8,060,863 | B2 * | 11/2011 | Brunswig et al. | 717/126 |
| 2002/0104068 | A1 * | 8/2002 | Barrett et al. | 717/104 |

(Continued)

OTHER PUBLICATIONS

Title: Modeling and Validation of Service-Oriented Architectures Author: Luciano Baresi Date: Mar. 14, 2003 http://portal.acm.org/citation.cfm?id=940071.940082.*
Antti M. Latva-Koivisto et al., Finding a complexity measure for business process models, Feb. 13, 2001, [Retrieved on Mar. 5, 2012]. Retrieved from the internet: <URL: http://citeseerx.ist.psu.edu/viewdoc/similar;jsessionid=A65B65749137565A62BC346EBC768290?doi=10.1.1.25.2991&type=ab> pp. 1-26.*

(Continued)

*Primary Examiner* — Don Wong
*Assistant Examiner* — Anibal Rivera
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to business process model validation and provide a method, system and computer program product for validating a service oriented architecture (SOA) oriented application. In an embodiment of the invention, a method for validating an SOA oriented application can be provided. The method can include transforming a business process model for an SOA oriented application into a directed and connected, acyclic graph, further transforming service groupings for the business process model into corresponding directed and connected, acyclic graphs, computing all paths from root node to leaf node in the graph for the business process model, and validating the business process model by ensuring no loops or cycles in the graph for the business process model, and further validating the business process model by ensuring no shared vertices amongst the graphs for the service groupings.

12 Claims, 2 Drawing Sheets

U.S. PATENT DOCUMENTS

| | | | | |
|---|---|---|---|---|
| 2002/0111841 | A1* | 8/2002 | Leymann et al. | 705/7 |
| 2005/0154918 | A1* | 7/2005 | Engberg | 713/201 |
| 2006/0106626 | A1* | 5/2006 | Jeng et al. | 705/1 |
| 2006/0200797 | A1* | 9/2006 | Grasselt et al. | 717/107 |
| 2007/0021995 | A1* | 1/2007 | Toklu et al. | 705/7 |
| 2007/0022404 | A1* | 1/2007 | Zhang et al. | 717/104 |
| 2007/0022410 | A1* | 1/2007 | Ban et al. | 717/104 |
| 2007/0038416 | A1* | 2/2007 | Benayon et al. | 703/2 |
| 2007/0136326 | A1* | 6/2007 | McClement et al. | 707/100 |
| 2008/0005743 | A1* | 1/2008 | Kraft et al. | 718/104 |
| 2008/0065455 | A1* | 3/2008 | Sun et al. | 705/8 |
| 2008/0163096 | A1* | 7/2008 | Pannese et al. | 715/772 |
| 2009/0019427 | A1* | 1/2009 | Li et al. | 717/126 |
| 2009/0031308 | A1* | 1/2009 | Busche et al. | 718/101 |
| 2009/0049444 | A1* | 2/2009 | Ottavi et al. | 718/101 |
| 2009/0113394 | A1* | 4/2009 | Weber et al. | 717/126 |
| 2009/0138294 | A1* | 5/2009 | Kumaran et al. | 705/7 |
| 2009/0171731 | A1* | 7/2009 | Bobak et al. | 705/8 |
| 2009/0172674 | A1* | 7/2009 | Bobak et al. | 718/101 |
| 2009/0172682 | A1* | 7/2009 | Bobak et al. | 718/103 |
| 2009/0172687 | A1* | 7/2009 | Bobak et al. | 718/104 |

OTHER PUBLICATIONS

Christopher Menzel et al., A Formal Foundation for Process Modeling, 2001, ISBN:1-58113-377-4 [Retrieved on Jul. 14, 2012]. Retrieved from the internet: <URL: http://dl.acm.org/citation.cfm?id=505168.505193> 14 Pages (256-269).*

Dmytro Rud et al., Performance Modeling of WS-BPEL-Based Web Service Compositions, IEEE 2006, [Retrieved on Jul. 14, 2012]. Retrieved from the internet: <URL: http://ieeexplore.ieee.org/stamp/stamp.jsp?tp=&arnumber=4027028> 8 Pages (140-147).*

Zhipeng Gui et al., A Data Dependency Relationship Directed Graph and Block Structures Based Abstract Geospatial Information Service Chain Model, IEEE 2008, [Retrieved on Jul. 14, 2012]. Retrieved from the internet: <URL: http://ieeexplore.ieee.org/stamp/stamp.jsp?tp=&arnumber=4624111> 7 Pages (21-27).*

* cited by examiner

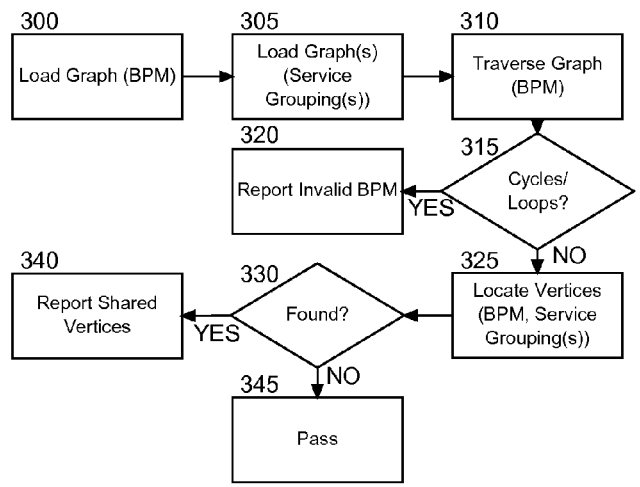
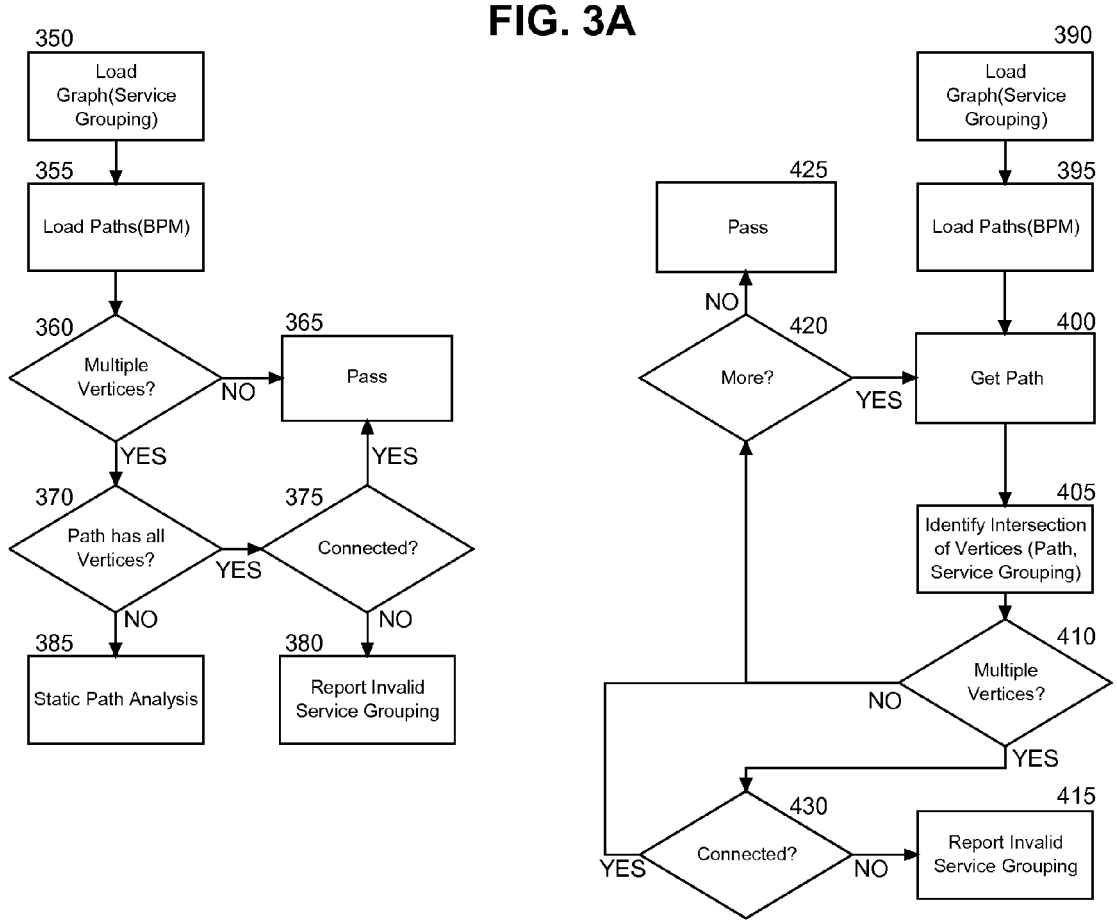
FIG. 3A
FIG. 3B
FIG. 3C

VALIDATION FRAMEWORK FOR SERVICE ORIENTED ARCHITECTURE (SOA) APPLICATION ADOPTION

BACKGROUND OF THE INVENTION

1. Field of the Invention

The present invention relates to the field of developing service oriented architecture (SOA) based systems and more particularly to the validation of an SOA application.

2. Description of the Related Art

As businesses and consumers become further interconnected through computer communications networks such as the global Internet and local intranets, the commerce sites and companion computing applications which integrate interactions between businesses and consumers alike are becoming ever more complex. Addressing the explosion of business to business and business to consumer interactions on-line, information technologists increasingly focus on architecting and implementing complete commerce site solutions to reflect the entire life cycle of a business in lieu of integrating multiple, disparate applications which when combined reflect the business life cycle. Consequently, as modern commerce sites can be both large and distributed, commerce systems have been configured to deploy complete e-commerce systems in as seamless a fashion as possible.

It is now a common trend that traditional, stand-alone, commerce oriented applications are produced from one or more components which can be individually re-used to create business processes for different solutions. Each of these components can expose itself as a set of reusable business functions, also referred to as "services" comporting with computing standards for deploying enterprise level logic that facilitate an open service oriented architecture (SOA). An SOA essentially can be defined as a system where all exposed business and technical functions are in the form of reusable services. These reusable services can communicate with each other to engage either in simple data passing between two or more services, or in activity coordination by two or more services.

In a SOA, a client can invoke an operation on a service to perform a function and, optionally the client can receive a response. Invoked services are generally business functions configured to fulfill the needs of business customers, whether those customers are individual consumers or other businesses. The functions can be grouped into various services where each service can specialize in functions such as catalog management, shopping cart management, credit card transaction processing, sales tax computation and the like. By utilizing an SOA, services in a commerce solution can interoperate with other business processes in a larger commerce solution involving one or more separate business entities and one or more separate consumer entities.

There are many benefits offered by an SOA application, but an unplanned and disorganized adoption of SOA opens organizations to many potential risks. In this regard, when transforming an organization to become SOA-compliant, one must consider how an enterprise architect ensures that desired services can be easily found. Also, one must consider how management can ensure that services comply with technology and business application standards. Yet further, one must consider how management can ensure that services can be reused to build an executable end-to-end software application. Finally, one must consider how the interoperation of the services can be controlled within the organizational structure of management.

BRIEF SUMMARY OF THE INVENTION

Embodiments of the present invention address deficiencies of the art in respect to business process model validation and provide a novel and non-obvious method, system and computer program product for validating an SOA oriented application. In an embodiment of the invention, a method for validating an SOA oriented application can be provided. The method can include transforming a business process model for an SOA oriented application into a directed and connected, acyclic graph, further transforming service groupings for the business process model into corresponding directed and connected, acyclic graphs, computing all paths from root node to leaf node in the graph for the business process model, and validating the business process model by ensuring no loops or cycles in the graph for the business process model, and further validating the business process model by ensuring no shared vertices amongst the graphs for the service groupings.

In one aspect of the embodiment, validating the business process model further can include determining that an individual one of the paths contains all vertices for a single one of the service groupings, and invalidating the single one of the service groupings if not all of the vertices contained in a single path are connected. In another aspect of the embodiment, validating the business process model further can include validating each of the service groupings containing only a single vertex in a corresponding graph. In yet another aspect of the embodiment, validating the business process model further can include computing an intersection between each path and a service grouping, determining whether or not each intersection includes multiple vertices and invalidating the service grouping when any intersection includes multiple vertices that are not connected.

In another embodiment of the invention, an SOA oriented application validation data processing system can be provided. The system can include a model transformation module configured to transform a business process model for an SOA oriented application into a directed and connected, acyclic graph, a service group transformation module configured to further transform a plurality of service groupings for the business process model into corresponding directed and connected, acyclic graphs, a path discovery module configured to compute all paths from root node to leaf node in the graph for the business process model, and model validation logic. The logic can include program code enabled to validate the business process model by ensuring no loops or cycles in the graph for the business process model, and to further validate the business process model by ensuring no shared vertices amongst the graphs for the service groupings.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodi

DETAILED DESCRIPTION OF THE INVENTION

Embodiments of the present invention provide a method, system and computer program product for SOA application validation. In accordance with an embodiment of the present invention, a business process model can be transformed into a directed graph and specified service groupings for the business process model also can be transformed into individual directed graphs. Thereafter, the individual directed graphs can be compared individually to the directed graph for the business process model to detect loops indicating an invalid grouping. Further, all paths traversing the directed graph of the business process model can be compared to the individual directed graphs for the service groupings and service grouping and paths with disconnected vertices can be detected to indicate an invalid service grouping. In this way, an SOA oriented business process model along with its specified service groupings can be validated no matter the complexity of the business process model.

Figure 1:
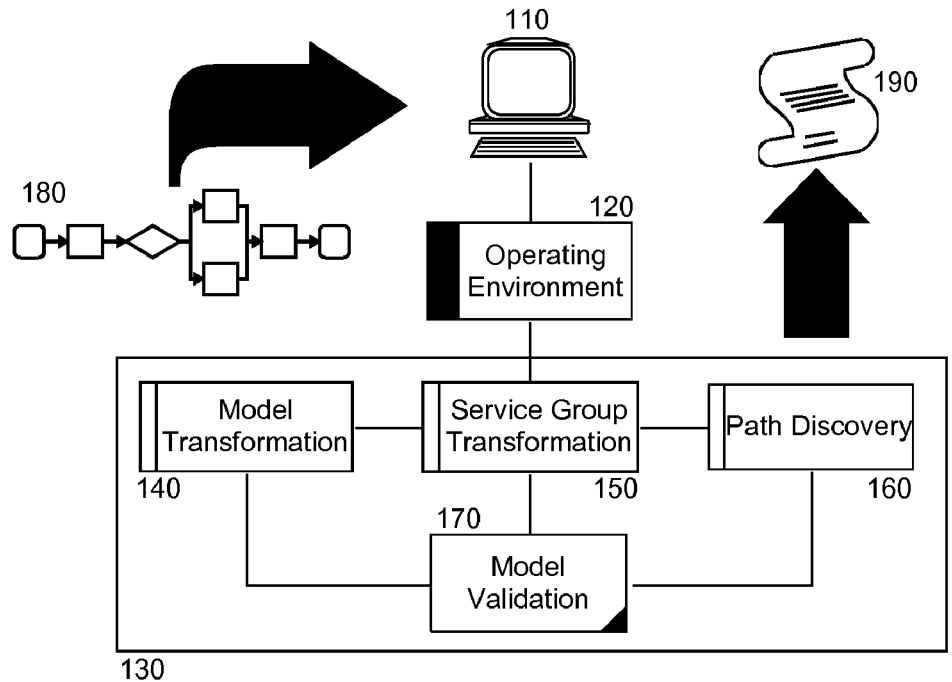
- FIG. 1 is a schematic illustration of a validation data processing system configured for SOA application validation.

In further illustration, FIG. 1 is a schematic illustration of a validation data processing system configured for SOA application validation. The system can include a host computing platform 110 supporting the execution of an operating environment 120. The operating environment 120 can be an operating system or virtual machine and can host the operation of a validation framework 130. The validation framework 130 can be configured to provide a validation 190 for an SOA oriented business process model 180 include sub-processes defined from amongst the service components of the SOA oriented business process model 180.

Specifically, the validation framework 130 can include a model transformation module 140, a service group transformation module 150 and a path discovery module 160. The validation framework 130 further can include model validation logic 170. The model transformation module 140 can be configured to transform the SOA oriented business process model 180 into a directed and connected, acyclic graph. Likewise, the service group transformation module 150 can be configured to transform different sub groupings of services reflected in the SOA oriented business process model 180 into respective directed and connected, acyclic graphs. Yet further, the path discovery module 160 can be configured to compute all paths traversing the directed graph for the SOA oriented business process model 180.

Notably, the model validation logic 170 can include program code enabled to process the directed and connected, acyclic graph for the business process model and the directed and connected, acyclic graphs for the service groupings of services and the computed paths to produce a list of invalid groupings 190. In this regard, the program code can be enabled to determine whether or not the graph for the business process model contains any cycles or loops. If so, the program code can be enabled to report an invalid business process model. Further, the program code can enabled to determine whether a given vertex in the graph of the business process model is contained in more than one of the graphs for the service groups. If so, the program code can be enabled to report a listing of the service groupings containing the same vertex can be reported as invalid grouping.

Even yet further, the program code can be enabled to process each individual graph for each corresponding service grouping to identify service groupings containing more than one vertex where not all contained vertices are connected along the same path. For those service groupings containing multiple vertices that are not connected along the same path, the program code can be enabled to report those service groupings as invalid. Finally, the program code can be enabled to process each path to identify intersecting service groupings demonstrating a common vertex or vertices. As such, the program code can be enabled to detect disconnected vertices in each intersecting service grouping. To the extent that disconnected vertices are detected in a service grouping, the program code can be enabled to report the service grouping as invalid.

Figure 2:
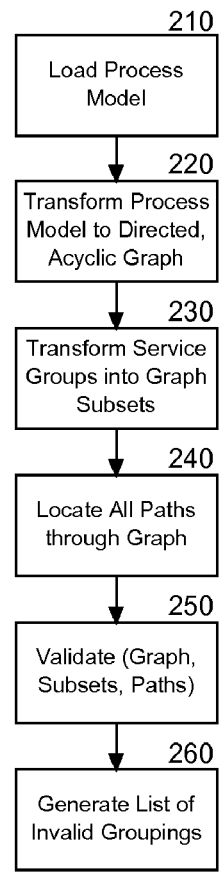
FIG. 2 is a flow chart illustrating a process for SOA application validation; and, FIGS. 3A through 3C, taken together, are a flow chart illustrating a process for validating an SOA business process model through directed and connected, acyclic graphs for the business process model and service groupings along with computed paths for the business process model.

In further illustration, FIG. 2 is a flow chart illustrating a process for SOA application validation. The process can begin in block 210 with the loading of a business process model. In block 220, the business process model can be transformed into a directed and connected, acyclic graph. In block 230, each set of service groupings as subsets of the business process model can be identified and also transformed individually into separate directed and connected service graphs. Yet further, all paths from root to leaf in the directed and connected, acyclic graph for the business process model can be computed. Finally, in block 250 the directed and connected, acyclic graphs for the business process model and service groupings can be validated along with the computed paths and in block 260 a list of invalid service groupings can be reported along with an indication if any of an invalid business process model.

Specifically, FIGS. 3A through 3C, taken together, illustrate a process for validating a business process model through directed and connected, acyclic graphs for the business process model and service groupings along with computed paths for the business process model. Referring initially to FIG. 3A, the directed and connected, acyclic graph for the business process model can be loaded in block 300, as can each directed and connected, acyclic graph for each corresponding service grouping of the business process model in block 305. In block 310, the graph for the business process model can be traversed to identify impermissible loops and cycles.

In decision block 315, if a loop or cycle can be identified in the graph for the business process model, in block 320 the business process model itself can be reported to be invalid. Otherwise, in block 325, each service grouping containing each vertex in the graph for the business process model can be identified and, in decision block 330, if a vertex in the graph is shared amongst multiple different service groupings, the service groupings sharing the vertex can be reported as invalid. Otherwise, the business process model can pass the first phase of validation.

In a second phase of validation, each service grouping can be analyzed for validity. Specifically, in connection with the analysis of a single service grouping, referring to FIG. 3B, in block 350 a directed and connected, acyclic graph can be loaded for the service grouping and all paths computed for the graph of the business process model further can be loaded in block 350. In decision block 360, if the service grouping contains only a single vertex, the service grouping can be determined to be valid in block 365 (and the process of FIG.

3B can be repeated for each other service grouping). Otherwise, the process can continue through decision block 370.

In decision block 370, if a single one of the computed paths contains all of the vertices of the service grouping, it can be determined in decision block 375 whether all vertices are connected in the path. If so, the service grouping can be determined to be valid in block 365. Otherwise, the service grouping can be reported invalid in block 380 (and the process of FIG. 3B can be repeated for each other service grouping). Yet, if a single one of the computed paths does not wholly contain the vertices of the service grouping, a fuller static path analysis can be performed in block 385.

Referring to the static path analysis shown in FIG. 3C, beginning in block 390 a directed and connected, acyclic graph can be loaded for the service grouping. In block 395 all of the paths for the graph of the business process model further can be loaded and in block 400 a first one of the paths can be selected for processing. In block 405, the intersection between the path and the service grouping, if any, can be determined in that the shared vertices of the service grouping in the path can be the intersection. In block 410 it can be determined whether or not multiple vertices are contained in the intersection. If not, in decision block 420 if additional paths remain to be considered, the process can continue for a next path in lock 400.

In decision block 410, if it is determined that multiple vertices are contained in the intersection, in block 430 it further can be determined whether or not all vertices in the intersection are connected. If not, in block 415 the service grouping can be reported as invalid. Otherwise, in decision block 420 if additional paths remain to be considered, the process can continue for a next path in block 400. When no further paths remain to be considered for the service grouping, the service grouping can be determined to be valid in block 425.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A method executed by a processor for validating a service oriented architecture (SOA) oriented application, the method comprising:
    transforming a business process model for an SOA oriented application into a directed and connected graph;
    further transforming a plurality of service groupings for the business process model into corresponding directed and connected, acyclic graphs;
    computing all paths from root node to leaf node in the graph for the business process model; and,
    invalidating the business process model in response to either identifying a loop or cycle in the graph for the business process model, or identifying a shared vertex amongst the graphs for the service groupings.

2. The method of claim 1, further comprises:
    determining that an individual one of the paths contains all vertices for a single one of the service groupings; and,
    invalidating the single one of the service groupings if not all of the vertices contained in a single path are connected.

3. The method of claim 1, further comprises validating each of the service groupings containing only a single vertex in a corresponding graph.

4. The method of claim 1, further comprises:
    computing an intersection between each path and a service grouping;
    determining whether or not each intersection includes multiple vertices; and,
    invalidating the service grouping when any intersection includes multiple vertices that are not connected.

5. A service oriented architecture (SOA) oriented application validation data processing system comprising:
    a computer system comprising at least one computer with memory and at least one processor;
    a model transformation module executing in the memory of the computer system and configured during execution to transform a business process model for an SOA oriented application into a directed and connected graph;
    a service group transformation module configured to further transform a plurality of service groupings for the business process model into corresponding directed and connected, acyclic graphs;
    a path discovery module configured to compute all paths from root node to leaf node in the graph for the business process model; and,
    model validation logic also executing in the computer system and comprising program code enabled to invalidate the business process model in response to either identifying a loop or cycle in the graph for the business process model, or identifying a shared vertex amongst the graphs for the service groupings.

6. The system of claim 5, wherein the program code is further enabled to determine that an individual one of the paths contains all vertices for a single one of the service groupings and to invalidate the single one of the service groupings if not all of the vertices contained in a single path are connected.

7. The system of claim 5, wherein the program code is further enabled to validate each of the service groupings containing only a single vertex in a corresponding graph.

8. The system of claim 5, wherein the program code is further enabled to computer an intersection between each path and a service grouping, to determine whether or not each intersection includes multiple vertices, and to invalidate the service grouping when any intersection includes multiple vertices that are not connected.

9. A computer program product comprising a computer usable storage medium storing computer usable program code for validating a service oriented architecture (SOA) oriented application, the computer program product comprising:
- computer usable program code for transforming a business process model for an SOA oriented application into a directed and connected, acyclic graph;
- computer usable program code for further transforming a plurality of service groupings for the business process model into corresponding directed and connected, acyclic graphs;
- computer usable program code for computing all paths from root node to leaf node in the graph for the business process model; and,
- computer usable program code for invalidating the business process model in response to either identifying a loop or cycle in the graph for the business process model, or identifying a shared vertex amongst the graphs for the service groupings.

10. The computer program product of claim 9, further comprises:
- computer usable program code for determining that an individual one of the paths contains all vertices for a single one of the service groupings; and,
- computer usable program code for invalidating the single one of the service groupings if not all of the vertices contained in a single path are connected.

11. The computer program product of claim 9, further comprises computer usable program code for validating each of the service groupings containing only a single vertex in a corresponding graph.

12. The computer program product of claim 9, further comprises:
- computer usable program code for computing an intersection between each path and a service grouping;
- computer usable program code for determining whether or not each intersection includes multiple vertices; and,
- computer usable program code for invalidating the service grouping when any intersection includes multiple vertices that are not connected.

* * * * *